United States Patent [19]

Crosetto

[11] Patent Number: 5,331,315

[45] Date of Patent: Jul. 19, 1994

[54] SWITCH FOR SERIAL OR PARALLEL COMMUNICATION NETWORKS

[75] Inventor: Dario B. Crosetto, DeSoto, Tex.

[73] Assignee: Universities Research Association, Inc., Washington, D.C.

[21] Appl. No.: 898,081

[22] Filed: Jun. 12, 1992

[51] Int. Cl.⁵ .................. H04Q 3/54; H04Q 11/06; H04J 3/16; G06F 13/362

[52] U.S. Cl. .................. 340/825.02; 340/825.05; 370/60.1; 370/94.1; 364/229.4; 395/325

[58] Field of Search .................. 340/825.01, 825.02, 340/825.05, 827, 825; 370/60, 60.1, 94.1, 94.2, 94.3, 16, 16.1; 395/325; 364/229.4, 949.91

[56] References Cited

U.S. PATENT DOCUMENTS

| | | | |
|---|---|---|---|
| 4,042,780 | 8/1977 | Wolters | 370/16.1 |
| 4,506,357 | 3/1985 | Nakayashiki | 370/16 |
| 4,514,807 | 4/1985 | Nogi | 364/200 |
| 4,539,655 | 9/1985 | Trussell et al. | 340/825.01 |
| 4,610,013 | 9/1986 | Long et al. | 371/9 |
| 4,623,884 | 11/1986 | Ihara et al. | 370/16.1 |
| 4,641,238 | 2/1987 | Kneib | 364/200 |
| 4,811,361 | 3/1989 | Bacou et al. | 375/25 |
| 4,816,993 | 3/1989 | Takahashi et al. | 364/200 |
| 4,858,177 | 8/1989 | Smith | 364/900 |
| 4,876,641 | 10/1989 | Cowley | 364/200 |
| 4,891,751 | 1/1990 | Call et al. | 364/200 |
| 4,912,704 | 3/1990 | Bonicioli et al. | 370/85.1 |
| 4,931,941 | 6/1990 | Krishnan | 340/825 |
| 4,945,534 | 7/1990 | Driscoll et al. | 370/94.3 |
| 4,975,913 | 12/1990 | Watanabe et al. | 370/112 |
| 4,989,202 | 1/1991 | Soto et al. | 370/13 |
| 4,990,985 | 2/1991 | Kamata | 357/24 |
| 4,992,933 | 2/1991 | Taylor | 364/200 |
| 5,005,151 | 4/1991 | Kurkowski | 364/900 |
| 5,014,189 | 5/1991 | Tamitani | 364/200 |
| 5,029,331 | 7/1991 | Heichler et al. | 371/43 |
| 5,179,548 | 1/1993 | Sandesara | 370/16.1 |
| 5,191,651 | 3/1993 | Halim et al. | 364/229.4 |

OTHER PUBLICATIONS

Henry et al., "A Segmented Ring Network with an Adaptive History-Based Protocol", Apr. 1992, *IEEE Proceedings South East Con '92*, pp. 1-5, USA.

Primary Examiner—Donald J. Yusko
Assistant Examiner—Mark H. Rinehart
Attorney, Agent, or Firm—Harris, Tucker & Hardin

[57] ABSTRACT

A communication switch apparatus and a method for use in a geographically extensive serial, parallel or hybrid communication network linking a multi-processor or parallel processing system has a very low software processing overhead in order to accommodate random burst of high density data. Associated with each processor is a communication switch. A data source and a data destination, a sensor suite or robot for example, may also be associated with a switch. The configuration of the switches in the network are coordinated through a master processor node and depends on the operational phase of the multi-processor network: data acquisition, data processing, and data exchange. The master processor node passes information on the state to be assumed by each switch to the processor node associated with the switch. The processor node then operates a series of multi-state switches internal to each communication switch. The communication switch does not parse and interpret communication protocol and message routing information. During a data acquisition phase, the communication switch couples sensors producing data to the processor node associated with the switch, to a downlink destination on the communications network, or to both. It also may couple an uplink data source to its processor node. During the data exchange phase, the switch couples its processor node or an uplink data source to a downlink destination (which may include a processor node or a robot), or couples an uplink source to its processor node and its processor node to a downlink destination.

22 Claims, 6 Drawing Sheets

PHASE 2 DATA
PROCESSING

FIG. 5

PHASE 3 DATA
EXCHANGE

SWITCH FOR SERIAL OR PARALLEL COMMUNICATION NETWORKS

This invention was made with Government support under contract No. DE-AC35-89ER40486 between Universities Research Association, Inc. and the Department of Energy. The Government has certain rights in this invention.

TECHNICAL FIELD OF THE INVENTION

The present invention relates in general to a high speed switch for either serial, parallel or hybrid networks with minimal protocol required to effectuate random burst transmissions of high density data. In particular, it relates to path control and amplification of signals by communication switches for messages being routed in a serial, parallel or hybrid communication network in the context of multi-processor systems or parallel processing systems with discrete data acquisition, data processing, and data exchange phases of operation.

BACKGROUND OF THE INVENTION

Large data processing applications are often partitioned such that they may be carried out by concurrently operating (parallel) processors, each of which handles a different portion of the problem. Independent of the complexity of the processing application, some data communication networks are challenging due to extensive geographic distribution of the elements supported by that communication network and the density of the data transmitted. In either of these two situations or their combination, efficient communication depends on the ability of the communication network to quickly route data from or to elements supported by the communication network. Speed must be maximized, especially in multi-processing systems having heavy traffic due to data acquisition and exchange, while data integrity and simplicity of transmission to any node, from the user's point of view, are maintained.

Prior art solutions called for a large software processing overhead to parse and interpret communication protocol and message routing at each node of the communication network. These prior art solutions have tended to trade speed in favor of flexibility. Examples of such prior art include the Scalable Coherent Interface (SCI), High Performance Parallel Interface (HIPPI), and Fiber Distributed Data Interface (FDDI).

The SCI approach transfers communication control words, destination addresses and source address, in addition to data in each 80 word communication packet. This imposes a burden of approximately 25% of the available packet space to communication protocol overhead (16 words), and time is spent parsing and interpreting every transmission.

The HIPPI is a simplex high performance communication interface which can transmit 800-1600 Megabits per second over a distance of 25 meters using copper cables. In the HIPPI approach, control lines are combined with data lines limiting the network topography to a static communication network configuration, making the HIPPI approach suitable only for parallel and distributed processing systems which have a static distribution of tasks.

The FDDI is a local area network based on token ring protocol. Information is transferred at the rate of 100 Megabits per second on the FDDI ring in frames that are variable in length. The FDDI provides a bridge between conventional high speed ethernet and high speed fiber optic link. It works such that a backbone FDDI ring connects a local island of ethernet workgroup to a similar island located in another part of the network. The FDDI approach requires that control lines, source address, destination addresses, and data travel on the same physical line, thereby imposing burdens similar to the message space and processing time dedicated to communication protocol by the SCI approach and the limitation of a fixed communication network configuration as in the HIPPI approach.

Crossbar switches have also been commercially available for interconnecting general purpose processing nodes. Crossbar switches have a fixed number of input/output ports. A crossbar switch may be programmed such that a message transmitted through the crossbar switch may be coupled from any input port to any specified output port. The limited number of nodes attachable to a single crossbar switch results in a high cost per channel when crossbar switches are applied to a geographically extensive multi-processor system consisting of a large number of parallel processors.

These approaches are unsatisfactory for providing efficient data communication in a geographically extensive multi-processor system. It is preferable for such a system to have the following features. It is preferable that the communication network provide simple node access, from the user's perspective, in a reconfigurable multi-processor system. The communication network should also preferably provide intrinsic flexibility to use any combination of the following: (a) multi drop, flat ribbon cable type communication link for short distances, (b) conventional copper (or similar) cable links with intermediary signal filter/amplifiers between start and end points of data transmission as required to prevent signal degradation and distortion if operating over long distances or in a high electromagnetic noise environment, (c) fiber optic links, (d) segmented point to point communication with the capability to concurrently transfer different data in different communication segments within the system, (e) serial data links, (f) parallel data links, or (g) a combination of any of the above approaches applied to individual communication network subsets within the multi-processor system communication network.

It is also preferable that the communication network provide the highest possible ratio of data transferred to transmission protocol overhead. It is preferred that the communication network facilitate SCI, HIPPI and FDDI interfaces, to other systems. The communication network should also preferably facilitate designer selection of the best type of connection and length for each segment within the communication network and interface(s) with other processing systems in accordance with the requirements of the specific application.

In sum, prior art communication schemes do not satisfactory provide for a high speed, minimal protocol overhead means for efficiently communicating a random burst of high density data within a geographically extensive multi-processor system during data acquisition/exchange modes of operation. A communication system design is needed which maximizes data routing speed while maintaining data integrity.

SUMMARY OF THE INVENTION

The present invention includes a processor controlled switching device that simplifies node access in a reconfigurable multi-processor system. It provides for efficient data transfer over the communication network with software protocol handled directly by processors over a separate communication network in support of the multi-processor system.

As an example, a complex multi-processor system supported by a communication network may include the following elements or any combination thereof: sensors, data storage or management devices, actuators, robots, remotely controlled instruments, processing nodes, communication processors, RISC processors, digital signal processors (DSP), transputers, computers, vector processors, or other devices. Such a system may operate in the following modes: initialization, data acquisition, data processing and data exchange. During an "Initialization Phase" each element in the system responds to control messages initiated by the master processor of the multi-processor system transmitted either directly or through subsequent re-transmission or interpretation by intermediary elements. During a "Data Acquisition Phase" each target processing node or data storage device is dedicated to the assimilation of the input data stream originating at the sensors or other data source as tasked by the master processor. During a "Data Processing Phase" each processing node is dedicated to the execution of its processing task as assigned by the master processor. During a "Data Exchange Phase", processing nodes send data to or receive data from other nodes in the parallel processing system for post-processing. Where a data processing system requires that the data acquired during a Data Acquisition Phase be reorganized (redistributed) within the system, a Data Exchange Phase may precede a Data Processing Phase.

A switching device according to the present invention maximizes data routing speed while maintaining data integrity in a geographically extensive communication network. The invention accomplishes this through the reduction of communication protocol overhead and the amplification of signals which would otherwise be lost due to signal degradation when transmitted long distances over copper wire cables.

In a preferred embodiment, the communication switch is comprised of several unidirectional parallel connectors, a receiver, a transmitter, and several routing switches. The connectors directly link the communication switch to its immediate neighbors in the communication network, which may comprise any of the system elements listed in the above example multi-processor system. A processor node includes a processor of some type suitable for the particular application of a processing system (e.g., computer, transputer, RISC, DSP, vector processor). A processor node may also include any of various types of memory, data storage/retrieval devices, display terminals or other devices common to scientific or business data processing applications.

Sensor suites, comprised of one or more sensors, may originate the raw input data streams which drive the processing system. The sensor suites may be geographically fixed or associated with mobile robots controlled by actuators. The sensor types, if any, would be selected in accordance with the particular application (e.g., photo multiplier, photo triode, wire chamber, drift chamber, heat sensors, motion sensors, pattern recognition sensors, voice sensors, radiowave sensors, microwave sensors, radiation sensors, and so forth). Data storage devices are dedicated mass storage devices or data base storage and management systems which may act as global data storage devices for the multi-processor system. Actuators, robots or other remotely controlled instruments which may form part of the system are treated in a manner analogous to both data storage devices and sensors combined in that they must be able to receive command data from the processor nodes and may have to report findings to one or more processor nodes.

The position of the internal routing switches of each communication switch is under the control of its host processor node. The host processing node sets the internal routing switches of the communication switch in accordance with the current operating phase of the processing system (data acquisition, data processing, or data exchange). The internal routing switches of each communication switch may be set to achieve any one of the following routing configurations: to allow a processor node to receive an input data stream from its associated sensor or equivalent input data stream generator, to allow broadcast of the input data stream originating at one sensor suite to all processor nodes in the processing system, to allow broadcast of the input data stream originating at one sensor suite to selected processor nodes in the processing system, to allow concurrent transmission of the input data stream from each sensor suite to its host processing node, to allow transmission of pre-processed data from one processor node to an adjacent processor node, to allow transmission of pre-processed data from one processor node to a non-adjacent processor node (s), to allow pass through of data not intended for receipt by the host processor, or to allow transmission of pre-processed data from one processor to all other processor nodes in the processing system.

The receiver and transmitter pair in each communication switch act to refresh each signal being transmitted over the communication network. The integrity of the signal (data transmission) which might otherwise have been lost or become unreliable due to signal transmission degradation over some limiting distance, is preserved in the network through amplification of the signal as it passes through each communication switch. The receiver and transmitter pair may be omitted if there is no anticipated signal degradation because the transmission is being effected over optical line or the distance actually traversed by the signal does not exceed the limit if the cable medium (e.g., 25 meters for copper wire).

A communication switch according to the present invention is, for example, ideally suited for use in a high energy physics experiment test bed which requires simultaneous data acquisition from all sensors for processing by parallel processors in the test bed. In addition to data acquisition, a switch according to the invention is also suited for use in systems exchanging large amounts of data between system elements in real-time, such as in real-time robotic applications and real-time image processing applications. Furthermore, a communication switch according to the present invention is suited for use in complex real-time simulations and replays such as war games where terrain, atmospheric conditions, resource deployment and movements, countermeasures, engagements, communication nets, and several other theater elements are simultaneously varied through the application of multiple input data streams and human interaction.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

The present invention relates to a method and apparatus for path control and amplification of signals being routed in a serial or a parallel communication network.

Figure 1:
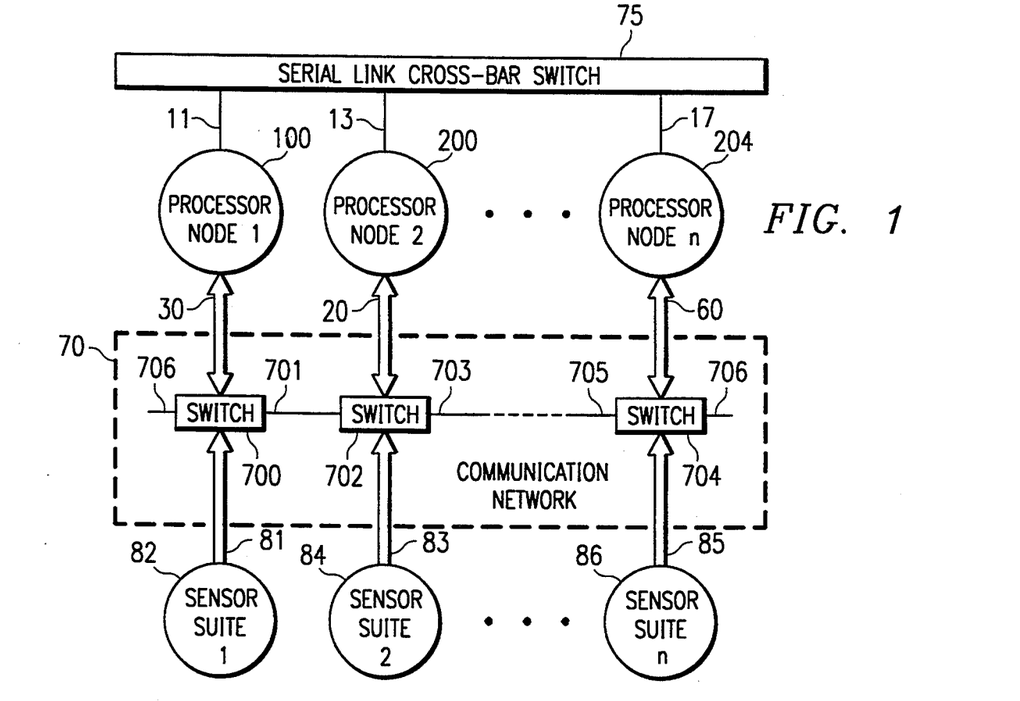
FIG. 1 is a block diagram of a multi-processor system supported by a communication network utilizing a preferred embodiment of communication switches according to the present invention.

FIG. 1 shows a multi-processor system supported by a communication network utilizing communication switches in accordance with the present invention. Processor nodes 100, 200, 204 are linked to the communication network 70 via communication links 30, 20, 60 which are directly connected to their associated communication switch 700, 702, 704 respectively. Sensor suites 82, 84, 86 are also linked to the communication network 70 via communication links 81, 83, 85 which are directly connected to their associated communication switch 700, 702, 704. The communication switches 700, 702, 704 are connected to each other in one-directional, closed loop by communication links 701, 703, 705, 706. Depending on the implementation required by the application, the communication links may be serial, parallel or a combination of serial and parallel data buses.

Each communication switch is under the direct control of its associated processor node. For example, the first communication switch 700 is controlled by the first processor node 100. In a concurrent parallel processing system or distributed processing system with discrete phases of operation, for a given topology, any processor node can be attributed the task of "master processor" for a given time or application. The master processor node controls the distribution of tasks among the other processor nodes (slaves) and monitors and directs their progress throughout each phase of operation. The control of the communication switch 700, 702, 704 by its associated (host) processor node 100, 200, 204 is responsive to the overall requirement of the system in its then current phase of operation (data acquisition, data processing, or data exchange). In effect, although an individual communication switch is directly controlled by its associated processor node, it is also ultimately controlled by the master processor node which controls the associated (slave) processor node.

This indirect means of controlling the communication switches by the master processor node allows the orchestration of data communication among nodes without collision problems. A token ring communication protocol may be used during implementation during the data exchange phase. However, the invention also contemplates bi-directional data communication between nodes. A segmented network through point to point communication with the capability to concurrently transfer different data in different communication segments within the system is suitable for all phases of operation.

The speed of data transfer within the system may be further improved through the separation of data transmission packets and their control in a manner similar to that taught in U.S. patent application Ser. No. 07/1,856,622, filed on Mar. 24, 1992 by Crosetto entitled "Parallel Data Transfer Network Controlled by a Dynamically Re-Configurable Serial Network", which is incorporated herein by reference. In that communication arrangement, each processor node communicates directly with other processor nodes over serial links which are primarily used for handling communication protocol. The transfer of large volumes of data from one processor node to one or more other processor nodes is done over a fast parallel hardware channel. The fast parallel hardware channel is essentially a flat ribbon cable with connectors configured in multi-drop mode.

The processor nodes 100, 200, 204 in FIG. 1 are shown linked to a serial link cross bar switch 75 via serial communication links 11, 13, 17 respectively. This illustrates the option of incorporating independent serial control of transmissions over the communication network 70 utilizing the communication switch 700, 702, 704 which is the subject of this invention.

The use of short control messages over direct, transputer to transputer, serial communication links to effect communication protocol for the transmission of large volumes of data between parallel processing nodes, is made easier for the designer by the availability of an operating system such as OCCAM on a transputer. Using a serial communication network to control the transmission of large volumes of data over a parallel communication network reduces the software protocol required to parse and interpret each message and increases the "pay load" for each transmission over the parallel communication network. The above approach, when combined with this invention, will increase the flexibility of the multi-processor system with respect to dynamic topographical reconfigurability while maintaining optimal transmission speed and data integrity.

Figure 2:
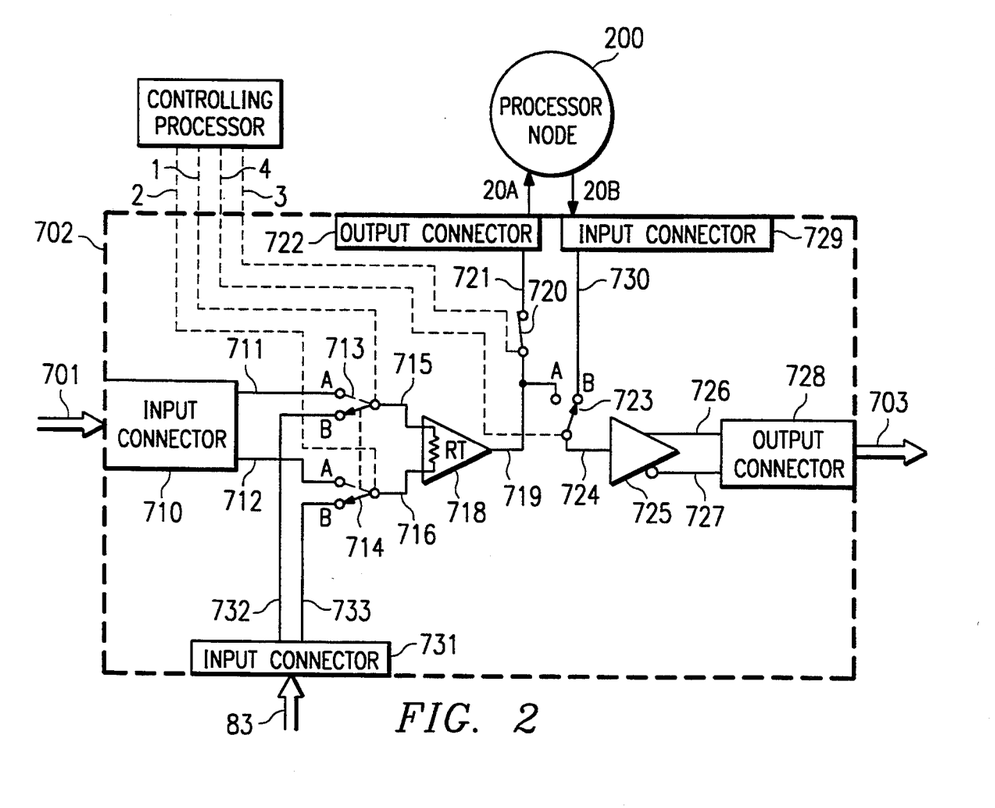
FIG. 2 is a block diagram of a preferred embodiment of a communication switch according to the present invention for use in a communication network where signal degradation is a concern.

FIG. 2 is a block diagram of a preferred embodiment of the communication switch 702 in accordance with the present invention for use in a geographically extensive parallel communication network where signal degradation may be a concern. Communication switch 702 is coupled to processor node 200 via 32-bit buses 20A and 20B. This communication switch is comprised of a plurality of one directional parallel connectors 710, 722, 728, 729, 731; a differential line receiver with common mode output 718; a line driver with common enable 725 and a plurality of analog multiplexer/demultiplexer switches 713, 714, 720, 723.

The differential line receiver 718 is suitable for use in balanced and unbalanced digital data transmission and permits connection directly to a bus-organized communication network. The line receiver 718 depicted in FIG. 2 is preferably a quadruple differential line receiver such as an MC3450 by Texas Instruments which has a three-state common mode output.

A line driver with common enable is used as the transmitter 725. When the enable input is high, a constant output current is switched between each pair of output terminals in response to the logic level at the input of that channel. When the enable is low, all channel outputs are nonconductive. This minimizes loading in part-time communication networks where a large number of drivers share the same line. The transmitter 725 depicted in FIG. 2 is preferably a quadruple line driver such as an MC3453 by Texas Instruments.

The routing switches 713, 714, 720 and 723 depicted in FIG. 2 are preferably dual four-channel analog multiplexer/demultiplexer switches such as CD4052BM/CD4052BC by Texas Instruments. This device is a 4-channel multiplexer having two binary control inputs, A and B and an inhibit input. The two binary input signals select 1 or 4 pairs of channel to be turned on and connect the differential analog inputs to the differential outputs. When a logical "1" is present at the inhibit input terminal all channels are "OFF". The preferred embodiment illustrated in FIG. 2 operates within a parallel communication network as described below.

During the data acquisition phase of operation, the communication switch 702 at the direction of its host processor node 200 sets routing switch pair 713 and 714 to position "B" and routing switch 720 to a closed position. If the input data stream 83 originating at the associated sensor suite is to be simultaneously transmitted to other nodes in the processing system, the host processor node 200 will also set routing switch 723 to position "A".

After the communication switch 702 is prepared for the receipt and routing of data as described above, input data stream 83 is passed by the one directional 32 bit parallel connector 731 to 32-bit parallel data busses 732 and 733, through switch pair 713 and 714, then on 32-bit parallel data busses 715, 716 to the differential input terminals of the receiver 718. The differential line receiver 718 converts the differential voltage input to a common-mode output signal which then continues to the host processor node 200 via 32-bit parallel data bus 719, routing switch 720, 32-bit parallel data bus 721 and through one directional output connector 722 and finally 32-bit parallel data bus 20A. No conversion occurs at the input connector 731 and the incoming data stream 83 is also in the form of a differential voltage transmission.

If the input data stream 83 originating at the associated sensor suite is to be simultaneously transmitted to other nodes in the processing system, the host processor node 200 pre-sets routing switch 723 to position "A". This enables the signal on 32-bit parallel data bus to pass through routing switch 723 and 32-bit parallel data bus 724 to line driver 725. The line driver 725 amplifies the signal and converts it from common mode input to differential voltage output carried on 32 bit data busses 726 and 727 through the one directional output connector 728 and on 32-bit parallel data line 703 to the up-link communication switch and beyond as required by the processing system application. No conversion occurs at the output connector 728, and the outgoing differential voltage signal carried by 726 and 727 is carried in the same form by 703.

During the data exchange phase of operation, if the data being transmitted to the communication switch 702 originates at an up-link source, the communication switch 702 will set routing switch pair 713 and 714 to position "A" at the direction of its host processor node 200. If the host processor node 200 is to receive the data being transmitted from an up-link source, routing switch 720 is set to closed position. If the data is to be transmitted to other nodes in the processing system, the host processor node 200 will also set routing switch 723 to position "A".

After the communication switch 702 is prepared for the receipt and routing of data as described above, data transmitted on 32-bit parallel data bus 701 is passed by the one directional 32 bit parallel connector 710 to 32-bit parallel data busses 711 and 712, through switch pair 713 and 714, then on 32-bit parallel data busses 715, 716 to the differential input terminals of the receiver 718. The differential line receiver 718 converts the differential voltage input to a common-mode output signal which then continues to the host processor node 200 via 32-bit parallel data bus 719, routing switch 720, 32-bit parallel data bus 721. The signal passes through one directional output connector 722 to 32-bit parallel data bus 20A. No conversion occurs at the input connector 710, and the data transmission signal on 701 is also in the form of a differential voltage transmission.

If the data originating at an up-link source is to be simultaneously transmitted to other nodes in the processing system, the host processor node 200 pre-sets routing switch 723 to position "A". The common mode signal on 32-bit parallel data bus 719 then passes through routing switch 723 and 32-bit parallel data bus 724 to line driver 725. The line driver 725 amplifies the signal and converts if from common mode input to differential voltage output. This output is then carried on 32-bit data busses 726 and 727 as differential voltages through the one directional output connector 728 and on 32-bit parallel data line 703 to the up-link communication switch and beyond as required by the processing system application. No conversion occurs at the output connector 728, and the outgoing differential voltage signal carried by 726 and 727 is carried in the same form by 703.

If the data to be transmitted originates at the host processor node 200, the host processor node 200 will set routing switch 723 to position "B" to allow distribution of the data to the adjacent communication switch down link and beyond as required by the application.

When not in use, routing switches are disabled or set to "open" position. The communication switch design allows a host processor node to receive data while transmitting its own data simultaneously provided that the incoming data is destined only for the host processor node.

Figure 3:
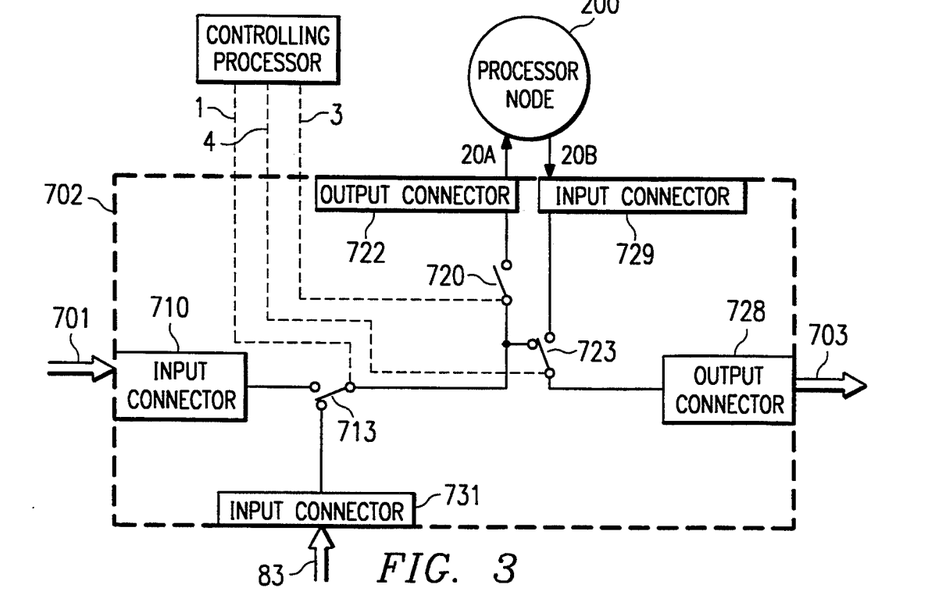
FIG. 3 is a block diagram of another preferred embodiment of a communication switch for use in a communication network where signal degradation is not a constraint.

The diagram in FIG. 3 illustrates another preferred embodiment of the communication switch for use in a geographically extensive parallel communication network operating in an environment where there is neither concern of signal distortion nor concern of signal degradation over distances between communication switches. An example is a communication network operating in a very low noise environment and very short total distance from source to terminal for a given transmission or in a geographically extensive communication network applying optical fiber technology. This communication switch is comprises of a plurality of one directional parallel connectors 710, 722, 728, 729, 731 and a plurality of analog multiplexer/demultiplexer switches 713, 714, 720, 723.

The communication switch of FIG. 3 operates in a manner analogous to that described for the communication switch illustrated in FIG. 2 except that there is neither concern of signal distortion nor concern of signal degradation over distances between communication switches. Therefore, the switch design dispenses with the receiver/driver pair and concentrates on controlling the data paths through the communication switch by setting the routing switches as described above.

Note that preferred embodiments illustrated in FIGS. 2 and 3 lend themselves equally well to serial communication network applications with minor changes in the connectors and communication links.

Figure 4:
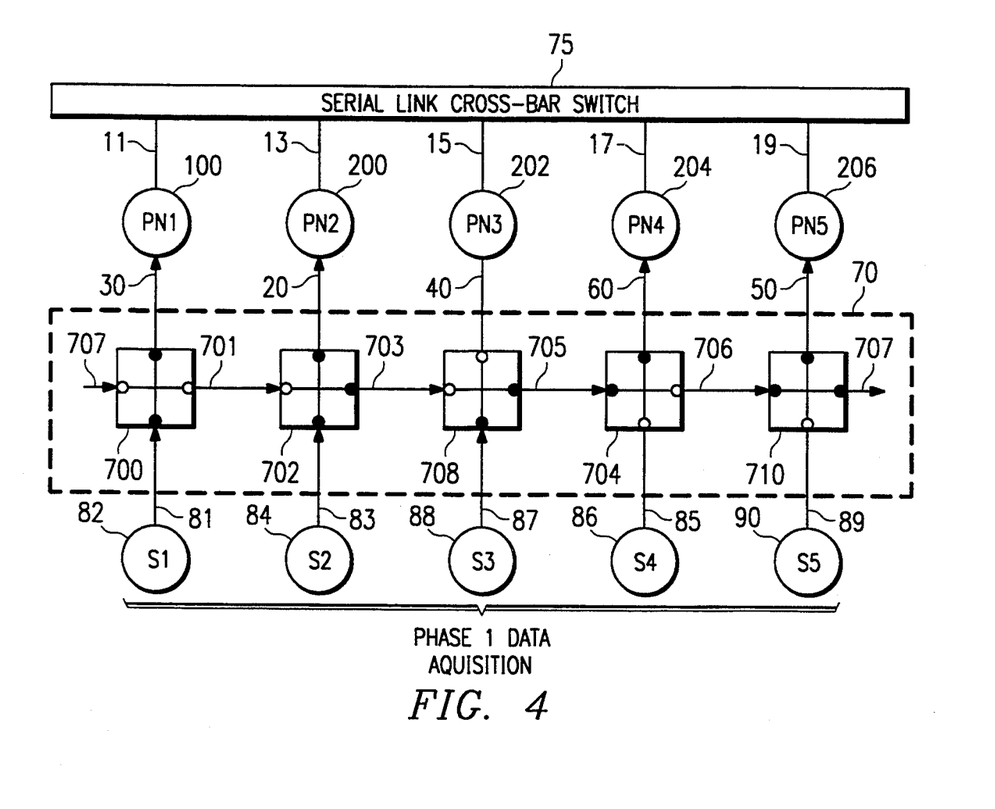
FIG. 4 is a block diagram representing the various possible logical settings for the communication switch of the present invention during the Data Acquisition phase of a multi-processor system's operation.
Figure 5:
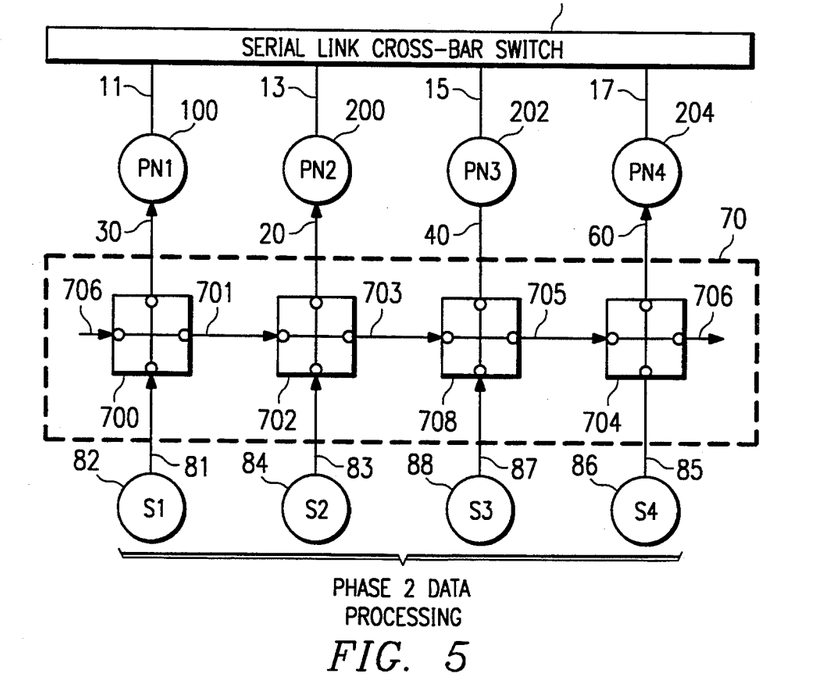
FIG. 5 is a block diagram representing the various possible logical settings for the communication switch of the present invention during the Data Processing phase of the operation of a multi-processor system.
Figure 6:
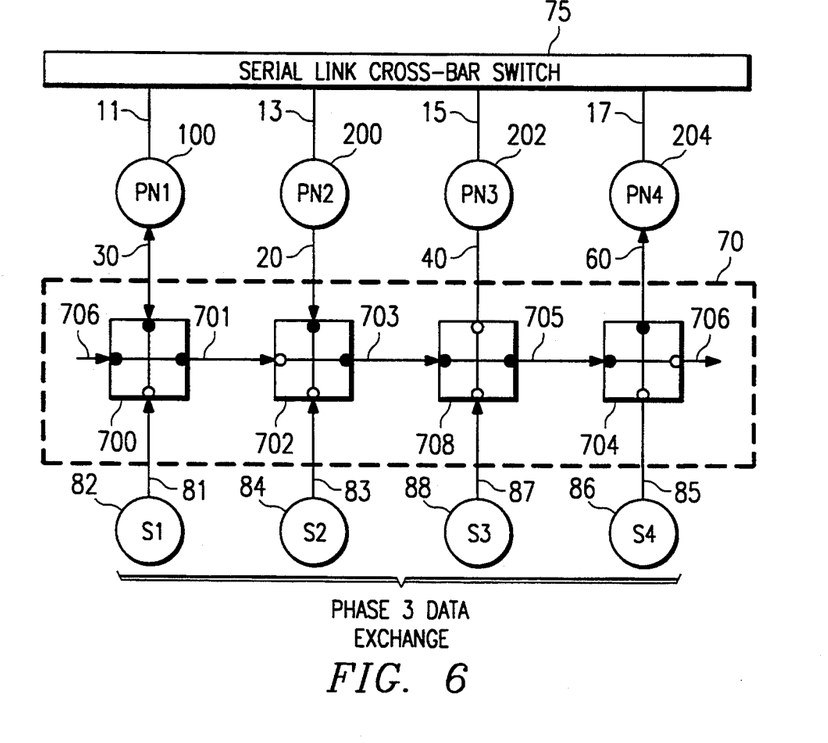
FIG. 6 is a block diagram representing the various possible logical settings for the communication switch during the Data Exchange phase of the operation of a multi-processor system.

The block diagrams of FIGS. 4, 5 and 6 represent the various possible logical settings of the communication switch of the present invention during each phase of the operation of a multi-processor system as described here. Any combination of logical settings may be used as required by a particular application during a given phase of operation. In a concurrent parallel processing system or distributed processing system with discrete phases of operation, for a given topology, any processor node can be attributed the task of "master processor" for a given time or application. The master processor node controls the distribution of tasks among the other processor nodes (slaves) and monitors and directs their progress throughout each phase of operation. The control of the communication switch 700, 702, 704 by its associated (host) processor node 100, 200, 204 is responsive to the overall requirement of the system in its then current phase of operation (data acquisition, data processing, or data exchange). In effect, although an individual communication switch is directly controlled by its associated processor node, since a slave processor node is controlled by the master processor node, the communication switch is also ultimately controlled by the master processor node.

This indirect means of controlling the communication switches by the master processor node allows the orchestration of data communication among nodes without collision problems. A processor controls the position of the internal routing switches contained in its associated communication switch. FIG. 2 shows dashed control lines 1,2,3,4 from a controlling processor to each internal routing switch 713,714,720,723. The controlling processor may be a master processor of the multi-processor system, a host node processor associated with that switch, or a processor assigned the task of communication management within the multi-processor system. In any case networks utilizing the communication switch transmit within an orchestrated overall system communication plan. When not in use, routing switches are disabled or set to "open" position.

Figure 7:
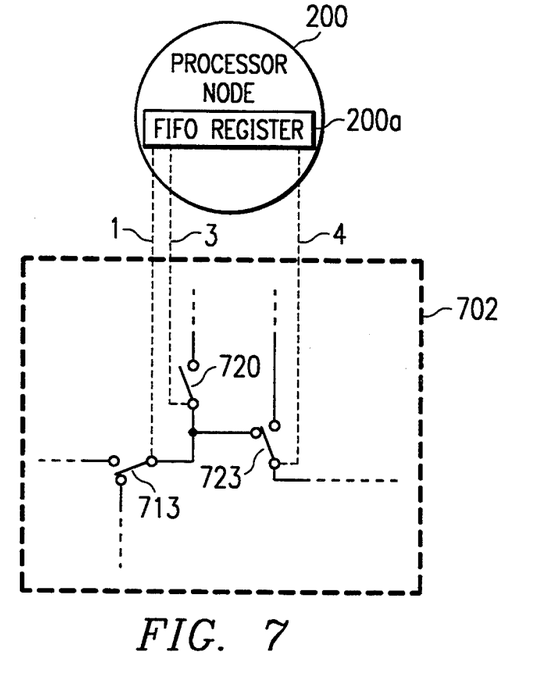
FIG. 7 is a block diagram showing another preferred embodiment of a communication switch of the present invention under processor control.

FIG. 7 shows another preferred embodiment of the communication switch of the present invention in which a host processor node 200 controls the communication switch 702 through the use of a memory location or register 200a directly connected via control lines 1,2,3 to the internal switches 713, 720, 723 of the communication switch 702. Details of the switch which are not essential to the illustration of the control means are eliminated for simplicity. The illustration of only a few internal switches and the simplified of the illustration depicted in FIG. 7 does not limit the complexity of the communication switch nor its relationship to a processor.

A preferred method of implementing processor control of the communication switch illustrated in FIG. 7 is as follows. First, determine the current phase of operation and the need of the host processor node to receive or transmit data. Second, use a look up table or function expression to create a control word. Third, cause the control word to be written to a pre-determined memory location which might be a register which directly controls the control lines of the switches. Finally, effect the functions encoded in the control word via the control lines connected from the register to the switches.

Referring again to FIG. 4, a block diagram of the switch of the present invention illustrates the various possible logical settings for the communication switch during the data acquisition phase of the operation of a multi-processor system. Although FIG. 4 illustrates the possible variations, it does not limit the sequence nor require use of every logical configuration of the switch. The processor nodes 100, 200, 202, 204 and 206 are shown linked to a serial link crossbar switch 75 via serial communications links 11, 13, 15, 17 and 19, respectively. The processor nodes 100, 200, 202, 204 and 206 are further linked to communication switches 700, 702, 708, 704 and 710 via communication links 30, 20, 40, 60 and 50, respectively. Sensor suites 82, 84, 88, 86 and 90 are linked to communication switches 700, 702, 708, 704 and 710 via communication links 81, 83, 87, 85 and 89, respectively.

The most common of the possible logical settings for the communication switch is illustrated in by communication switch 700 which depicts data flowing from the sensor suite exclusively to its host processor node through the communication switch. Communication switch 700 is set such that an input data stream 81 from the first sensor suite 82 (or equivalent data stream generator) can flow only to the first processor node 100.

Communication switch 702 is set such that data originating at second sensor suite 84 may flow to both its associated processor node 200 and other down-link destinations within the multi-processor system.

Communication switch 708 is set such that data originating at third sensor suite 88 does not flow to its host processor node 202 but rather to other down link destinations within the multi-processor system.

Communication switch 704 illustrates the situation where the associated sensor suite 86 for the receiving host processor node 204 is either disabled or non-existent and the data to be processed by processor node 204 originated somewhere up-link. Communication switch 704 is set such that data originating up-link is allowed to flow only to processor node 204.

In a similar situation, communication switch 710 is set to allow data originating up-link to flow to both processor node 206 and to other down-link destinations within the multiprocessor system. It is also possible to omit data flow to processor node 206 and provide a pass through uplink to downlink coupling.

FIG. 5 is a block diagram representing the only logical setting allowed for a communication switch 700, 702, 708, 704 during the discrete data processing phase of the operation of a multi-processor system. Communication flow is disabled in all directions during this phase of operation.

Some applications of parallel processing require iterative intermediate data processing and data exchange phases of operation prior to overall task completion. In such applications the communication switches logical state will alternate between one or more of the states depicted in FIG. 6 (data exchange phase) and the state depicted in FIG. 5 (data processing phase).

FIG. 6 is a block diagram illustrating the various possible logical settings for a communication switch during the data exchange phase of the operation of a multi-processor system. FIG. 6 illustrates the possible variations but does not limit the sequence nor require use of every logical configuration of the switch.

Communication switch 700 is set to allow data originating up-link to flow to both processor node 100 and to other down link destinations within the multi-processor system. The communication switch design allows a host processor node 100 to receive data from an up-link source while simultaneously transmitting data originating at the host processor node 100 to other down-link destinations within the multi-processor system. This last variation is possible if and only if the incoming data from an up-link source is destined only for the host processor 100 and is not to be passed on to other down-link destinations.

Communication switch 702 is set that data originating at its host processor node 702 will flow to destinations down-link. Communication switch 708 is set such that data originating at an up-link source is passed through to down-link destinations within the multi-processor system, without being received by the host processor node 202. Communication switch 704 is set such that data originating at an up-link source is received only by the host processor node 204.

Figure 8:
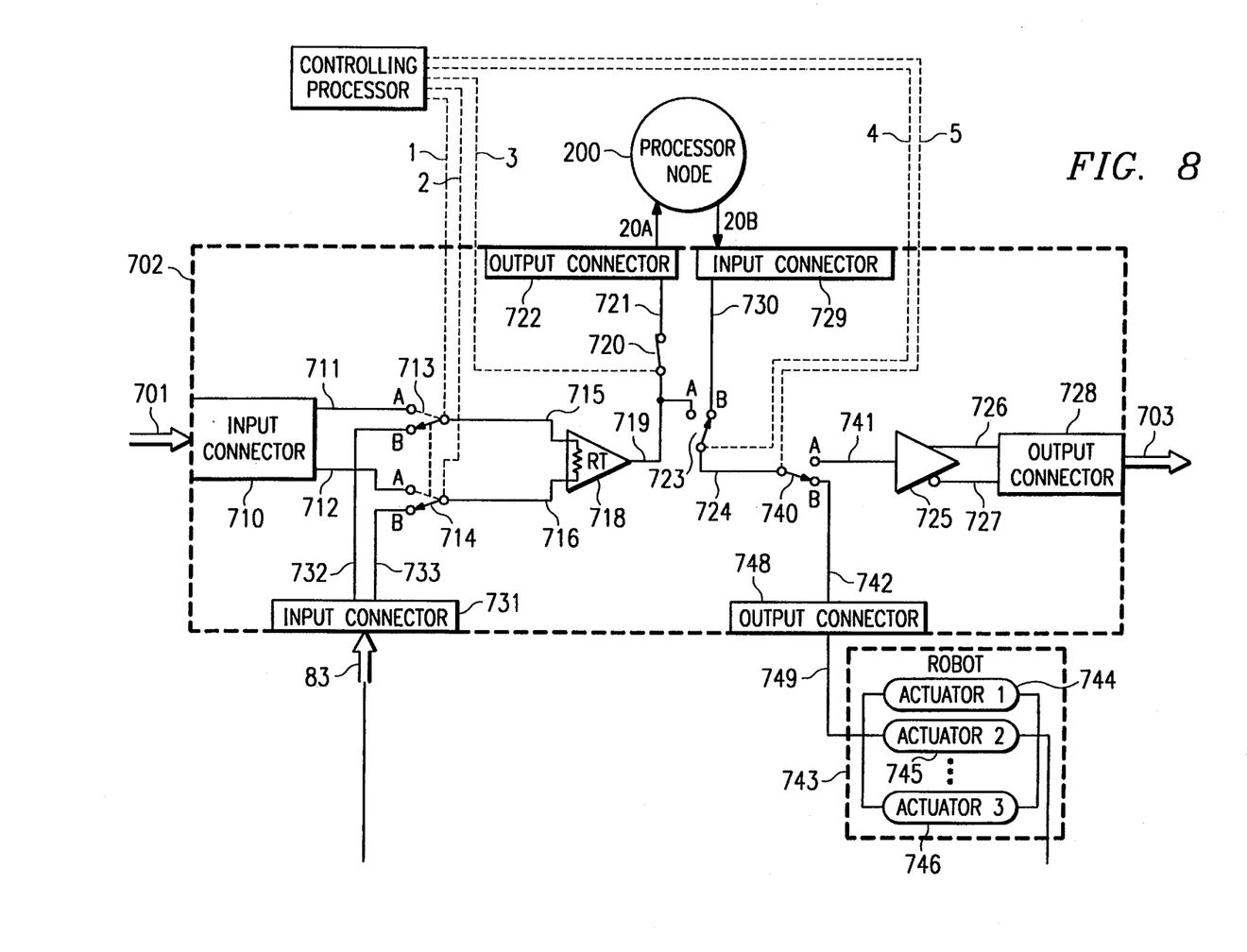
FIG. 8 is a block diagram showing another preferred embodiment of the communication switch of the present invention which includes coupling with a remotely controlled device.

FIG. 8 depicts another preferred embodiment of the communication switch of the present invention coupled with a remotely controlled device. A message originating at host processor node 200 is coupled with actuators 744, 745, 746 in a robot device 743 over link 20B to input connector 729. The message flows from the connector 729 over data bus 730 through switch 723 set to the "B" position. The message then travels over data bus 724 through switch 740 set to the "B" position over data bus 742 through output connector 748 over link 749 which couples to actuators 744, 745, 746. Resulting data, if any, are coupled with the input data stream 83 and handled as described in the FIG. 2 discussion.

A message originating at an uplink processor node is coupled with the actuators 744, 745, 746 in a robot device 743 over link 701 to input connector 710. The message then travels over data buses 711,712 through switches 713, 714 set to the "A" position over data busses 715, 716 through line receiver 718. It continues over data bus 719 through switch 723 set to position "A". The message goes over data bus 724 through switch 740 set to the "B" position over data bus 742 through output connector 748 and over link 749 which couples to actuators 744, 745, 746 with commands. Resulting data, if any, are coupled with the input data stream 83 and handled as described in the FIG. 2 discussion.

Figure 9:
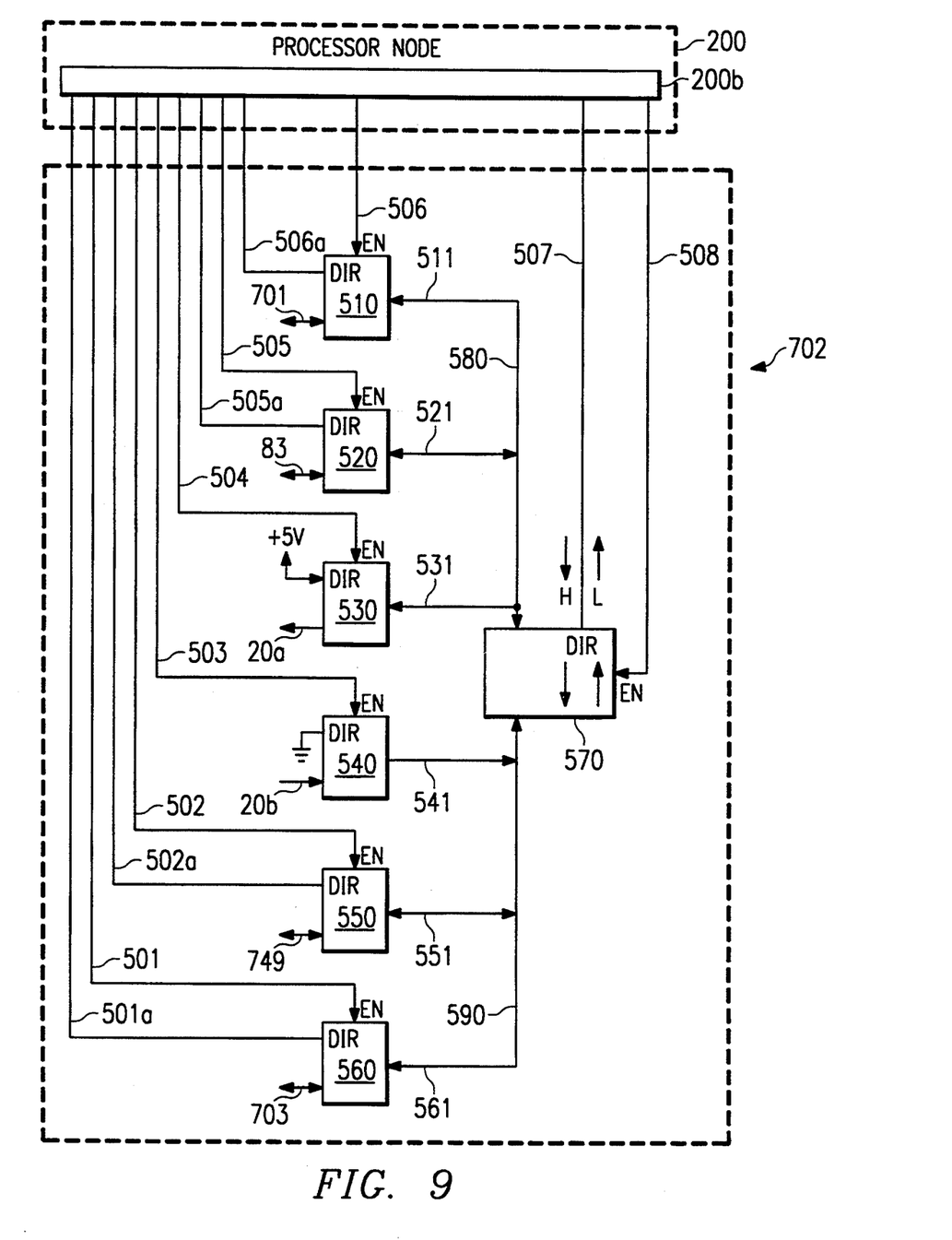
FIG. 9 is block diagram of another preferred embodiment for the communications switch depicted in FIG. 8.

Referring now to FIG. 9, shown is another preferred implementation of switch 702, using buffer/transceiver circuits 510, 520, 530, 540, 560 and 570 in place of internal switches. A buffer/transceiver circuit receives, buffers and retransmits digital data. The buffer/transceiver circuits in switch 702 are under control or register 200b in processor node 200. The register stores a word or words that determine logic levels of signals on control lines 501, 501a, 502, 502a, 503, 504, 505, 505a, 506, 506a, 507 and 508, which in turn control the buffer/transceiver circuits. The width of all control lines are a single bit. Each control line is associated with one bit of a word written to register 200b and assumes the value of that bit. However, the control lines are permitted to be multiple bits wide to accommodate, if necessary, circuits chosen to handle the functions of the buffer/transceiver circuits. In this case, the register would then store multiple words for controlling the state of the switch.

Each buffer/transceiver circuit includes and Enable port (EN) for enabling receiving, buffering and transmission of digital data, as well as a Direction (DIR) port determining the direction of transmission of the digital data. A buffer/transceiver circuit is enabled for receiving, buffering and transmitting a digital data by presentation of a signal having a predetermined logic level (an enable signal) to its Enable port. Control lines 501, 502, 503, 504, 505, 506 and 508 are connected to Enable ports of buffer/transceiver circuits 560, 550, 540, 530, 520, 510 and 570, respectively, and carry Enable signals. Similarly, the direction of transmission is determined by the logic level of a Direction signal on a Direction port: a logic high signal causes the buffer/transceiver circuit to transmit in a first direction; and a logic low signal causes the buffer/transceiver circuit to transmit in a second direction. Direction signals are delivered to Direction ports on buffer/transceiver circuits 510, 520, 550, 560 and 570 on, control lines 506a, 505a, 502a. 501a and 507. Buffer/transceiver circuits 530 and 540 transmit in only one direction as they handle data flow to and from, respectively, a host processing node. Therefore, the Direction port for buffer/transceiver circuit 530 is tied to a logic high voltage (5 volts), and the Direction port for buffer/transceiver circuit 540 is tied to ground. Because of the control of transmission direction provided by buffer/transceiver circuits, the embodiment of the switch 702 differs from embodiments shown in FIGS. 1-8 in that it is bi-directional.

Buffer/transceiver circuits 510 and 520, when enabled, act to receive and transmit data signals outside switch 702, depending on the direction of transmission. Buffer/transceiver circuit 510 is coupled to data line 701 and to internal data line 580. In a first direction, it receives data on data line 701 from an uplink source, buffers it and then transmits it, via data line 511, to internal data line 580. In the other direction, it receives and buffers data on internal data line 580 and transmits it to an uplink destination. Similarly, when enabled and operating in the first direction, buffer/transceiver circuit 520 receives and buffers data from a sensor suite 84 (FIG. 1) carried by a signal on data line 83 and transmits it, via data line 521, to internal data line 580. In the other direction, data is transmitted to sensors via line 83. Buffer/transceiver circuit 530, when enabled by an appropriate signal on control line 504, acts to transmit data signals outside the switch 702 on line 20a to a host processor (not shown). Through data line 531, buffer/transceiver circuit 530 receives and buffers data carried by signals on internal data line 580. Only one of the two buffer/receiver circuits 510 and 520 is enabled at time to transmit on internal data line 580, while the remaining two buffer/transceivers on internal data line 580 receive data if they are enabled and their transmission direction is on a data line outside of the switch 702.

Buffer/transceiver circuit 540 acts to receive data from a host processor node with signals on data line 20b. It then buffers the data and transmits, via data line 541, on internal data line 590. Buffer/transceiver circuits 550 and 560 are coupled by, respectively, internal data lines 551 and 561 to internal data line 590. The buffer/transceiver circuits 550 and 560 are also coupled to external data lines 749 and 703, respectively. In a first direction, buffer/transceiver circuit 550 receives and buffers data on internal data line 590 and transmits it on line 749 to an actuator. In the other direction, data is transmitted from the actuator on data line 749 and transmits it on internal data bus 590. Similarly, buffer/transceiver circuit 560 receives and buffers data on internal data line 590 and transmits it to a downlink destination on line 703 in the first direction. In the other direction, it receives data from the downlink source on line 703 and transmits on internal data line 590. Only one of the buffer/transceiver circuits 540, 550 and 560 is permitted or enabled to transmit on the internal data line 590 at any given time. The other two may receive and buffer data on internal data line 590 and transmit it to an external data line.

Internal data lines 580 and 590 are coupled through buffer/transceiver circuit 570. When enabled by an enabling signal on control line 508, the buffer/transceiver circuit 570 receives and buffers data on one of the two internal data lines 580 and 550 and transmits it on the other of the two lines. The direction of transmission is determined by the logic level of the signal on the Direction port of the buffer/transceiver circuit, as indicated in the figure. When buffer/transceiver 570 is not enabled, a host processor node on data line 20a is permitted to receive data from an uplink source on data line 701 or from a sensor on line 83 through internal data line 580, and to transmit to a robot on line 749 or to a downlink destination on line 703 through internal data line 590.

When buffer/transceiver circuit 570 is enabled, only one of the buffer/transceiver circuits 510, 520, 540, 550 and 560 is enabled for transmitting data on internal data line 580 or 590. When the logic level of the direction signal on control line 507 is high, data from an uplink source on data line 701 or from a sensor on data line 83 may be transmitted through the other buffer/transceiver circuits, to one or more of the following: downlink destination on data line 703; a robot or actuator on line 749; to an uplink destination on line 701 (if data is originating from a sensor on data line 83), to a sensor on line 83 (if data is originating from an uplink source on line 701) or a host processor on data line 20a. Reversing direction of transmission of buffer/transceiver circuit 570 allows data received from an actuator on data line 740 or from a downlink source on line 703 to be transmitted to on or more of the following: an uplink destination on line 701; a sensor on data line 83; a host processor on data line 20a; an actuator on data line 740 (if originating from a downlink source); or a downlink destination data line 703 (if originating from an actuator on data line 740. In this direction, it is also possible for the host processor to transmit data to the switch on line 20b and to receive that data on line 20a for diagnostic purposes.

Each buffer/transceiver circuit is preferably implemented using commercially available integrated circuits in order to reduce cost and improve ease of manufacture and service. An example of a suitable integrated buffer/transceiver circuit is designated 74ALS245 and manufactured by Texas Instruments, Inc. of Dallas, Tex. Each integrated circuit is 8-bits wide and has an operational frequency of 250 MHz. Data lines 511, 521, 531, 541, 551, 561, 580, 590, 701, 83, 703, 20a, 20b and 749 are 32 bit parallel data buses. Consequently, four 74ALS245 chips are required to implement each buffer/transceiver circuit 510, 520, 530, 540, 550, 560 and 570. The system is not limited, however, to any particular bandwidth. Other examples of suitable integrated buffer/transceiver circuits are 74F245 (operating at 250 MHz) and 74ABT245 (operating at 344 MHz) manufactured by Signetics/Phillips of Sunnyvale, Calif. Furthermore, it is permissible though not desirable to have the functions of the integrated buffer/transceiver circuits handled by discrete receiving, buffering and transmitting circuits.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

What is claimed is:

1. A communications switch for transmission of bursts of data for use in a communication network supporting a geographically extensive multi-processor system and having a dynamically reconfigurable topology, comprising:

a master processor of the multi-processor system operative to generate a plurality of control signals for routing of data within the multi-processor system wherein the generation of said plurality of control signals is not based on the information content of said data:

first switch means for coupling a first communication link carrying a first data stream from an uplink source to a host processor of the multi-processor system, the first switch means responsive to a first control signal from the master processor;

second switch means for coupling the host processor to a second communication link for carrying a second data stream to a downlink destination, the second switch means responsive to a second control signal from the master processor; and third switch means for coupling the first communication link to the second communication link for carrying a third data stream from an uplink source to a downlink destination, the third switch means responsive to a third control signal from the master processor.

2. The switch of claim 1 further comprising further switch means for coupling a data source associated with the communications switch to a host processor node, the further switch means responsive to a further control signal from the master processor.

3. The switch of claim 1 further comprising further switch means for coupling a host processor to an actuator associated with the communications switch, the further switch means responsive to a further control signal from the master processor.

4. The switch of claim 1 further comprising further switch means for coupling an uplink source to an actuator associated with the communications switch, the further switch means responsive to a further control signal from the master processor.

5. The switch of claim 1 further comprising further switch means for coupling a data source associated with the communications switch to the second communication link for carrying a data stream from the data source to a downlink destination, the further switch means responsive to a further control signal from the master processor.

6. The switch of claim 1 further comprising an amplifier for refreshing said first, second or third data streams coupled by the switch.

7. A switch for transmission of bursts of data in a data communication network supporting a geographically extensive multi-processor system, the system having a plurality of processor nodes, each processor node having an associated switch, the switch comprising:
   a master processor of the multi-processor system operative to generate first and second command signals during a discrete data acquisition phase of the multi-processor system and further operative to generate third command signals during a data exchange phase of operation of the multi-processor system, wherein the generation of said command signals is not based on the information content of said data;
   first switch means, coupled to said master processor and responsive to the first command signal for selectively coupling an input data stream from a data source associated with the switch to said associated processor node;
   second switch means, coupled to said master processor and responsive to the second command signal for selectively disabling data transmissions through the switch; and
   third switch means, coupled to said master processor and responsive to the third command signal for selectively coupling communications links to neighboring switches for coupling a flow of data from an uplink processor node to a downlink processor node within the multi-processor system.

8. The switch of claim 7 further comprising:
   said master processor of the multi-processor system operative to generate further command signals during a discrete data acquisition phase of the multi-processor system, wherein the generation of said command signals is not based on the information content of said data; and
   further switch means, coupled to the master processor and responsive to the further command signal, for selectively coupling communication links to neighboring switches for communicating said input data stream to another processor node.

9. The switch of claim 7 further comprising:
   said master processor of the multi-processor system operative to generate further command signals during a discrete data acquisition phase of the multi-processor system, wherein the generation of said command signals is not based on the information content of said data; and
   further switch means, coupled to the master processor and responsive to the further command signal, for selectively coupling a communication link coupled to a neighboring switch to an actuator means coupled to the switch for coupling a flow of data from an uplink processing node to the actuator means.

10. The switch of claim 7 wherein the master processor node creates a control word representative of a state of the first switch means, the second switch means and the third switch means, and causes the control word to be written to a pre-determined memory location; the memory location being coupled to control lines controlling the state of the first, second and third switch means.

11. A switching apparatus coupled to a host processor node for transmission of bursts of data for use in a communication network supporting a geographically extensive multi-processor system having a plurality of processor nodes, said switch apparatus comprising:
   a first input connector;
   a second input connector;
   a third input connector;
   a first output connector;
   a second output connector;
   a first switch means having an open position, a first closed position and a second closed position;
   a second switch means having an open position, a first closed position and a second closed position;
   a third switch means having an open position and a closed position;
   control lines coupled from the host processor node to the first, second and third switch means for controlling the positions of said switch means; and
   a master processor of the multi-processor system operative to generate a plurality of control signals on said control lines for routing of data within the multi-processor system wherein the generation of said plurality of control signals is not based on the information content of said data;
   wherein said first input connector is coupled to said first output connector when said first switch means is in a first closed position and said third switch means is in a closed position;
   said first input connector is coupled to said second output connector when said first switch means is in a first closed position and said second switch means is in a first closed position;
   said third input connector is coupled to said first output connector when said first switch means is in a second closed position and said third switch means is in a closed position;
   said third input connector is coupled to said second output connector when said first switch means is in a second closed position and said second switch means is in a first closed position; and
   said second input connector is coupled with said second output connector when said second switch means is in a second closed position.

12. The switch apparatus of claim 11 wherein the master processor:
   (a) determines a current phase of operation of the multi-processor system and the need of the host processor node to receive, pass or transmit data;
   (b) creates a control word;

(c) causes the control word to be written to a predetermined memory location; and (d) effects the functions encoded in the control word via the control lines connected from the memory word bits to the switch means causing the switch means to respond by opening or closing the switch means in the appropriate position.

13. The switch of claim 11 further comprising:

a line receiver and a line driver wherein the input of said line receiver is coupled to the first switch means output and the output of said line receiver is coupled to the third switch means and the first position of the second switch means output; and the input of the said line driver is coupled to the second three-state switch and the output of said line driver is coupled to the second output connector.

14. A method of switching of bursts of data for use in a communication network supporting a geographically extensive multi-processor system and having a dynamically reconfigurable topology, the method comprising the steps of:

generating a plurality of control signals from a master processor of the multi-processor system for routing of data within the multi-processor system, wherein the generation of said plurality of control signals is not based on the information content of said data;

coupling a first communication link carrying a data stream from an uplink source to a host processor node by activating a first state of a communications switch in response to a first control signal from the master processor;

coupling the host processor to a second communication link for carrying a data stream to a downlink destination by activating a second state of said communications switch in response to a second control signal from the master processor; and coupling the first communication link to the second communication link for carrying a data stream from an uplink source to a downlink destination by activating a third state of said communications switch in response to a third control signal from the master processor.

15. The method of claim 14 further comprising the step of coupling a data source associated with the communications switch to said host processor node by activating a further state of said communications switch in response to a further control signal from the master processor.

16. The method of claim 14 further comprising the step of coupling said host processor to a remotely controlled device associated with the communications switch by activating a further state of said communications switch in response to a further control signal from the master processor.

17. The method of claim 14 further comprising the step of coupling said uplink source to a remotely controlled device associated with the communications switch by activating a further state of said communications switch in response to a further control signal from the master processor.

18. The method of claim 14 further comprising the step of amplifying a data stream coupled by the communications switch to said downlink destination.

19. A data communications network for transferring bursts of data in a geographically extensive, multi-processor system having a plurality of processor nodes operating in coordination, the data communications network comprising:

a master processor of the multi-processor system operative to generate a plurality of control signals for routing of data within the multi-processor system wherein the generation of said plurality of control signals is not based on the information content of said data;

first, second and third communications switches;

a first data communications link between the first and second switches, and a second data communications link between the second and third switches;

three processing nodes, each coupled for data communication to one of the three communication switches;

each of the three communication switches adapted to independently assume one of a plurality of routing positions for data flow through the switch in response to said control signals from the master processor; the plurality of routing positions for data flow including a first routing position for a data flow from one of the two communications links to the processor node associated with the communications switch, a second routing position for a data flow from the processor node associated with the switch to another one of the two other communications switches through one of the two communications links, and a third routing position for a data flow from the first communication link to the second communication link.

20. The data communications network of claim 19 further including a data source coupled to one of the three communication switches; and wherein the plurality of routing positions further includes a further routing position for a data flow from the data source to one of the two communications links.

21. The data communications network of claim 19 wherein the plurality of routing positions further includes a further routing position for a data flow from one of the three processor nodes to an actuator associated with the processor node and coupled to the switch.

22. The data communications network of claim 19 further including a data source coupled to one of the three communication switches; and wherein the plurality of routing positions further includes a first routing position for a data flow from the data source to the processor node associated with the switch.

* * * * *